(12) United States Patent
Niitsuma et al.

(10) Patent No.: US 7,414,612 B2
(45) Date of Patent: Aug. 19, 2008

(54) ANALOG INPUT DEVICE

(75) Inventors: Hirofumi Niitsuma, Fukushima-ken (JP); Kazutoshi Watanabe, Fakushima-ken (JP); Junichi Inamuara, Fukushika-ken (JP); Isao Sato, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 644 days.

(21) Appl. No.: 10/890,864

(22) Filed: Jul. 14, 2004

(65) Prior Publication Data
US 2005/0012730 A1    Jan. 20, 2005

(30) Foreign Application Priority Data
Jul. 18, 2003    (JP) .............................. 2003-199266

(51) Int. Cl.
G06F 3/02 (2006.01)
G06G 5/00 (2006.01)
H01H 3/12 (2006.01)
H01H 1/10 (2006.01)

(52) U.S. Cl. .................. 345/160; 345/168; 200/341; 200/512

(58) Field of Classification Search ......... 345/156–184; 200/341–345, 512–513
See application file for complete search history.

(56) References Cited

U.S. PATENT DOCUMENTS

| 5,144,103 | A | * | 9/1992 | Suwa | 200/344 |
| 6,977,644 | B2 | * | 12/2005 | Endo et al. | 345/157 |
| 2001/0008398 | A1 | * | 7/2001 | Komata | 345/156 |
| 2002/0050918 | A1 | | 5/2002 | Furudate et al. | |
| 2003/0122691 | A1 | | 7/2003 | Olodort et al. | |
| 2004/0118665 | A1 | * | 6/2004 | Ito | 200/5 A |

FOREIGN PATENT DOCUMENTS

JP    2000-274078    10/2000
WO    WO 01/52037    7/2001

OTHER PUBLICATIONS

Search Report dated Nov. 2, 2004 for European Patent Application No. EP 04 25 4255.

* cited by examiner

*Primary Examiner*—Richard Hjerpe
*Assistant Examiner*—Mahmoud Fatahi Yar
(74) *Attorney, Agent, or Firm*—Brinks Hofer Gilson & Lione

(57) ABSTRACT

In an analog input device, a rubber member is provided between a key top and a movable electrode of an analog-quantity generating unit. A dead zone can be removed or reduced by forming a bottom portion of the rubber member of a flat or curved face. Furthermore, since first round surfaces are connected to an outer side face, the linearity of the input (e.g., a load)-output (voltage) characteristic can be enhanced.

4 Claims, 8 Drawing Sheets

ANALOG INPUT DEVICE

This application claims the benefit of priority to Japanese Patent Application No. 2003-199266, herein incorporated by reference.

BACKGROUND OF THE INVENTION

1. Field of the Invention

The present invention relates to an analog input device mounted in, for example, a controller for a game machine, and more particularly, to an analog input device that improves the output characteristic with respect to changes in load or stroke during a key-pressing operation.

2. Description of the Related Art

FIG. 7 is a cross-sectional view showing a state of a known analog input device before deformation, and FIGS. 8A and 8B are graphs showing the input-output characteristic of the analog input device. In FIG. 8A, the input represents the load, and the output represents the number of bits obtained by subjecting the analog output voltage between a movable electrode and a resistor to A/D conversion. In FIG. 8B, the input represents the stroke, and the output represents the number of bits, in a manner similar to that in FIG. 8A.

In an analog input device 1 shown in FIG. 7, an analog-quantity generating unit 3 is provided on the inner bottom face of a base 2 to output analog signals. An elastically deformable rubber member 4 is provided on the analog-quantity generating unit 3. A key top 5 is supported at the top of the rubber member 4 so that it can move in the Z1- and Z2-directions.

The rubber member 4 has an annular base portion 4a on its outer periphery, and a thin-walled support portion 4b extending from the base portion 4a toward the axis O-O. A pressing portion 4c is provided integrally with the leading end of the support portion 4b, and protrudes in the Z2-direction.

In the analog-quantity generating unit 3, a resistor 3b provided on the bottom face of the base 2 opposes a movable electrode 3a with a small gap therebetween in the Z1-direction.

In this analog input device 1, when the key top 5 is pressed in the Z2-direction, the entire rubber member 4 is elastically deformed. Since the pressing portion 4c depresses the movable electrode 3a of the analog-quantity generating unit 3, the movable electrode 3a is bent into contact with the surface of the resistor 3b.

In this case, since the contact area between the movable electrode 3a and the resistor 3b varies depending on the load or stroke of the key top 5 during a key-pressing operation, the resistance therebetween correspondingly varies. Therefore, when the key top 5 is depressed in a state in which a fixed resistor is connected to the resistor 3b in series and a predetermined voltage is applied between the movable electrode 3a and the fixed resistor, a voltage (analog signal output) output from both ends of the fixed resistor in accordance with the load applied to the key top 5 or the stroke of the key top 5 is detected.

The above conventional art is disclosed in, for example, Japanese Unexamined Patent Application Publication No. 2002-093274.

In the above-described analog input device 1, however, the load F applied to the key top 5 is transmitted to the rubber member 4 through an annular pressed portion 4d at the upper end, and is concentratively applied from the rubber member 4 to the movable electrode 3a through one point B at the leading end of the pressing portion 4c.

When it is assumed that a load F is applied to a point A on the pressed portion 4d of the rubber member 4, a moment M centered on the point B is applied to the point A in the direction shown by the arrows. The moment M is proportional to the distance between the points A and B and a component F·sin θ of the load F, and distorts the rubber member 4. Since the rubber member 4 is distorted before the movable electrode 3a touches the resistor 3b, a resistance is not produced between the movable electrode 3a and the resistor 3b until the rubber member 4 is distorted to some extent and the movable electrode 3a is pressed into contact with the resistor 3b.

This means that a dead zone W appears in the conventional analog input device. In the dead zone W, an output is not presented until the load exceeds 0.39 N (approximately equal to 40 gf) (see FIG. 8A) or the stroke exceeds 0.7 mm (see FIG. 8B) even when the key top 5 is pressed.

In this way, in the above analog input device 1, the load or stroke of the key top 5 is distributed by the rubber member 4, and the force for pressing the movable electrode 3a is not efficiently transmitted. For this reason, the output response to the input is not quick, and the output is produced only by applying at least a predetermined load or stroke. Consequently, the linearity of the input-output characteristic is poor.

SUMMARY OF THE INVENTION

In order to overcome the above problems of the conventional art, an object of the present invention is to provide an analog input device that enhances the force transmission efficiency of a rubber member, that improves the input-output response, and that achieves good linearity of the input-output characteristic.

According to an aspect, the present invention provides an analog input device including a key top to be pressed, an analog-quantity generating unit for outputting an analog signal in accordance with the amount of pressing of the key top, and a rubber member for pressing the analog-quantity generating unit by elastic deformation in accordance with the amount of pressing of the key top, wherein a bottom portion of the rubber member is close to or in contact with the analog-quantity generating unit in a predetermined area.

When the key top is pressed, a pressing portion of the rubber member is first pressed down, a movable electrode touches a resistor, and the entire rubber member is then distorted. Therefore, an analog output can be quickly produced in response to the pressing of the key top, and a dead zone that easily appears in the input-output characteristic can be removed or reduced.

Preferably, the rubber member includes a base portion provided on the outer periphery, a support portion extending from the base portion toward the center of the rubber member, and a pressing portion provided at the center, and wherein, in a cross section of the rubber member taken along a plane including the center axis of the pressing portion, an outer surface of the pressing portion includes first round surfaces connected to the bottom portion and having a first radius, and outer side portions provided between the first round surfaces and the support portion.

Preferably, the pressing portion has a cavity, and a second round surface having a second radius is provided on a bottom face of the cavity.

Preferably, the second round surface includes first and second parts that are disposed symmetrically with respect to the axis, and a flat or curved face is provided between the first and second parts.

Preferably, the first and second parts are offset from the first round surfaces toward the axis in the radial direction orthogonal to the axis.

According to the above-described analog input device, since the contact area between the movable electrode and the resistor can be gradually increased, linearity of the input-output characteristic can be enhanced.

Preferably, the analog-quantity generating unit includes a movable electrode and a resistor opposing with a predetermined gap therebetween, and the bottom portion of the pressing portion is disposed close to or in contact with the movable electrode or the resistor.

The analog input device may include an electrostatic capacitance means composed of a movable electrode and a fixed electrode opposing each other, and may detect an electrostatic capacitance that varies depending on the change in the distance between the movable electrode and the fixed electrode due to pressing of the key top.

Further objects, feature, and advantages of the present invention will become apparent from the following description of the preferred embodiments with reference to the attached drawings.

DESCRIPTION OF THE PREFERRED EMBODIMENTS

Figure 1A:
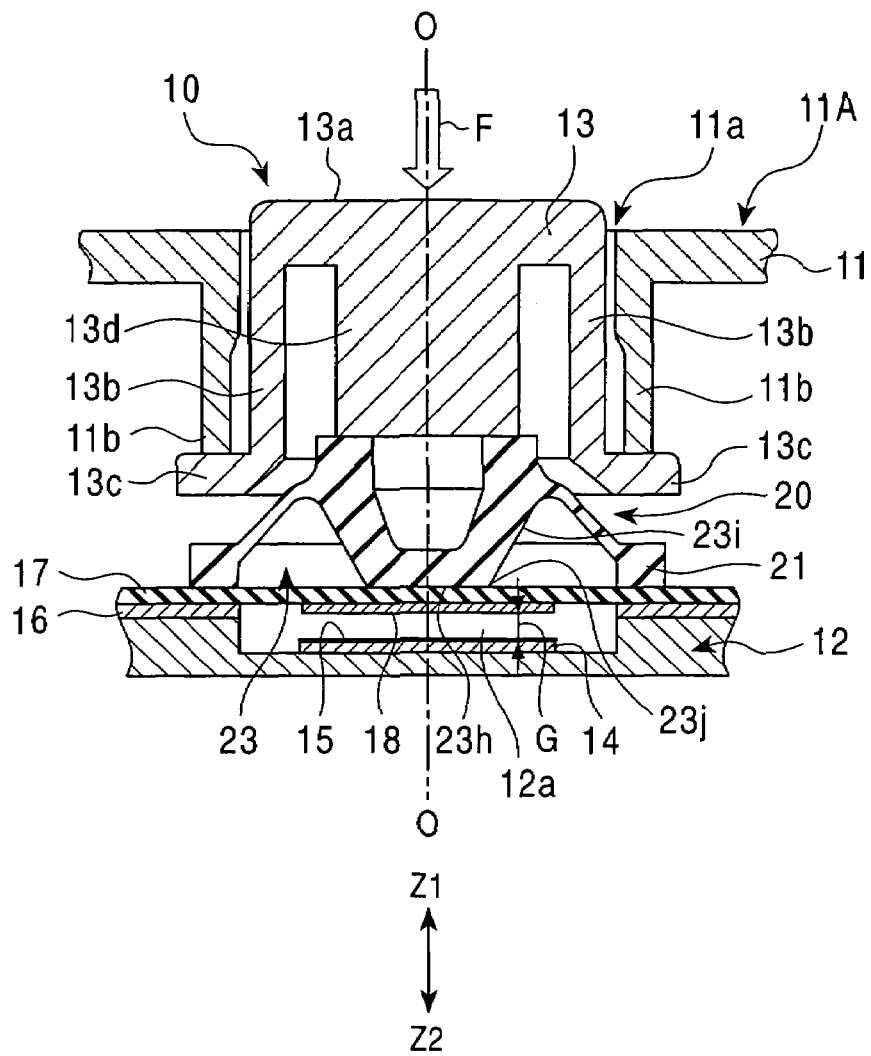
FIG. 1A is a cross-sectional view of an analog input device according to a first embodiment of the present invention.
Figure 1B:
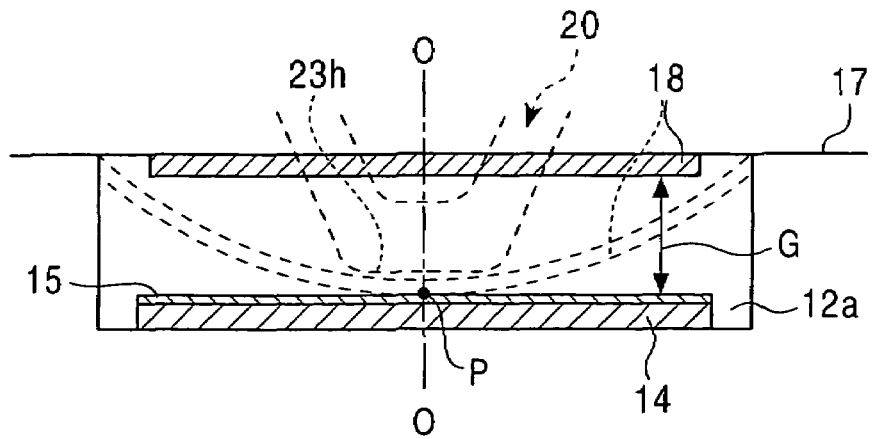
FIG. 1B is a partly enlarged cross-sectional view of the analog input device, showing a movable electrode and a resistor after deformation.
Figure 2:
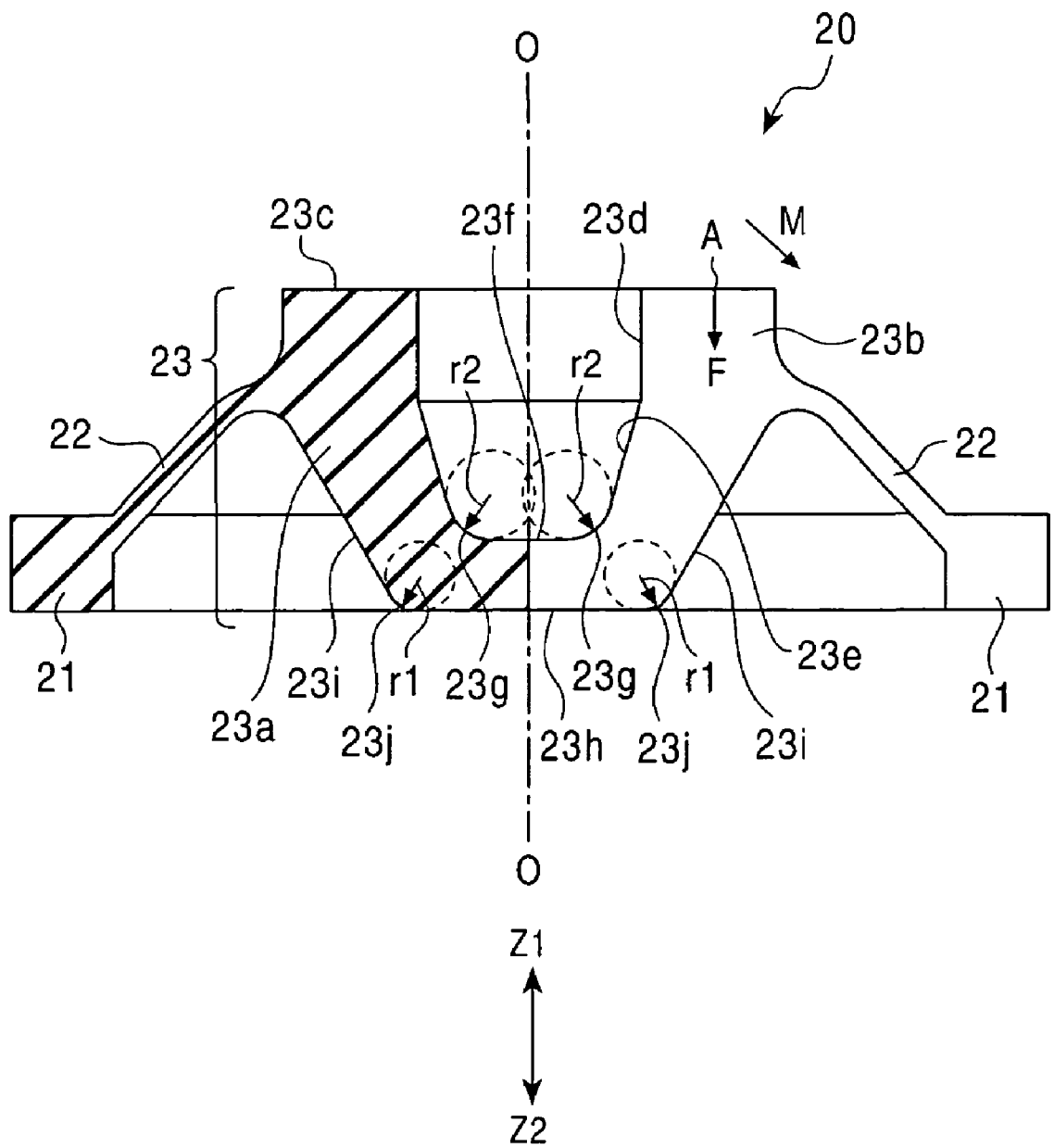
FIG. 2 is a cross-sectional view of a rubber member in the first embodiment.

FIG. 1A is a cross-sectional view of an analog input device according to a first embodiment of the present invention, FIG. 1B is an enlarged cross-sectional view of a section of the analog input device including a deformed movable electrode and a resistor, and FIG. 2 is a cross-sectional view of a rubber member.

An analog input device 10 shown in FIG. 1A is, for example, one of the four keys that constitute a cross key of a controller for a game machine.

As shown in FIG. 1A, the analog input device 10 is provided between an upper case 11 and a lower case 12. The upper case 11 has an opening 11a, and a key top 13 is supported inside the opening 11a so as to be pressed in the Z1-Z2 directions. A face portion 13a serving as an upper surface of the key top 13 slightly protrudes from a surface 11A of the upper case 11 in the Z1-direction. A side portion 13b extends from the face portion 13a in the Z2-direction, and a flange portion 13c is provided around the lower end of the side portion 13b. The flange portion 13c can be placed in contact with a lower end face of an inner side portion 11b of the upper case 11 that defines the opening 11a. A presser portion 13d is integrally provided inside the side portion 13b and at the lower center of the face portion 13a, and projects in the Z2-direction.

The lower case 12 forms a base, and includes a recess 12a provided in the Z2-direction corresponding to the opening 11a of the upper case 11. A fixed electrode 14 shaped like a flat plate is provided in the recess 12a. As shown in FIG. 1B, a resistor 15 formed by printing or applying a resistive material is provided on the surface of the fixed electrode 14.

A spacer 16 made of an insulating material is provided on the surface of the lower case 12 except the recess 12a, and an elastically deformable sheet member 17 is provided thereon. A movable electrode 18 formed by, for example, printing is provided on the lower surface of the sheet member 17 to oppose the resistor 15. That is, the resistor 15 and the movable electrode 18 oppose with a predetermined small gap G therebetween. The movable electrode 18 and the resistor 15 constitute an analog-quantity generating unit that generates an analog signal (output voltage Vo), as will be described later.

In the first embodiment, an elastically deformable rubber member 20 is provided between the presser portion 13d of the key top 13 and the sheet member 17. The key top 13 is supported while being biased in the Z1-direction by the biasing force of the rubber member 20. The rubber member 20 is composed of an elastic resin, for example, silicone rubber or an elastomer.

The rubber member 20 shown in FIGS. 1A and 2 includes an annular base portion 21 on its outer periphery, and a support portion 22 extending diagonally upward from the base portion 21 toward the center. A pressing portion 23 is provided integrally with the leading end of the support portion 22. The cross-section of the pressing portion 23 is substantially U-shaped so as to be symmetrical with respect to an imaginary axis O-O passing through the center of the rubber member 20. The pressing portion 23 includes a protruding portion 23a protruding in the Z2-direction, and a cylindrical portion 23b extending in the Z1-direction. A cavity is provided inside the protruding portion 23a and the cylindrical portion 23b. An end face of the cylindrical portion 23b defines as a ring-shaped pressed portion 23c.

The cavity of the rubber member 20 is defined by an inner face 23d of the cylindrical portion 23b, an inner wall 23e whose diameter gradually decreases from the lower end of the inner face 23d in the Z2-direction to take a substantially conical form, and a flat or curved bottom face 23f. Second round surfaces 23g having a predetermine radius (second radius) r2 are provided between the bottom face 23f and the inner wall 23e. As shown in FIG. 2, the second round surfaces 23g are disposed symmetrically with respect to the axis O-O, and the bottom face 23f is provided therebetween.

An outer surface of the pressing portion 23 includes a bottom portion 23h formed of a flat face or a curved face having a large radius of curvature, and an outer side face 23i extending from the bottom portion 23h to the support portion 22. First round surfaces 23j having a predetermined radius (first radius) r1 are provided between the bottom portion 23h and the outer side face 23i so as to be disposed symmetrically with respect to the axis O-O. That is, the bottom portion 23h is provided between the first round surfaces 23j. The bottom portion 23h is also close to or in contact with the surface of the sheet member 17.

When the key top 13 is pressed by applying a load F in the Z2-direction to the face portion 13a, the presser portion 13d presses the pressed portion 23c of the rubber member 20 in the Z2-direction. Therefore, the rubber member 20 is elastically deformed, and the pressing portion 23 is moved in the Z2-direction.

Also, the bottom portion 23h of the rubber member 20 presses the sheet member 17, as shown in FIG. 1B. Therefore, the sheet member 17 and the movable electrode 18 disposed on the lower surface of the sheet member 17 are deformed and bent in the Z2-direction. When the amount of shift of the movable electrode 18 in the Z2-direction becomes equal to the small gap-G between the movable electrode 18 and the resistor 15, the lowermost point P of the bent movable electrode 18 touches the surface of the resistor 15. The contact of the movable electrode 18 with the resistor 15 produces a resistance Rx therebetween.

As shown in FIG. 2 as the cross-sectional view, the bottom portion 23h of the rubber member 20 is formed of a flat surface or a curved surface having a large radius of curvature, and touches the sheet member 17 in a predetermined area. Therefore, a force is not concentratively applied to the movable electrode 18 through a point of the bottom of the rubber member 20, which is different from the conventional devices.

Accordingly, the moment M acting on a point A on the pressed portion 23c can be made smaller than in the conventional devices. For this reason, the rubber member 20 is hardly distorted, and the load F acting on the pressed portion 23c can be efficiently transmitted to the movable electrode 18. Consequently, the movable electrode 18 is shifted in the Z2-direction only by applying a small load F or stroke, and the movable electrode 18 can be bent into contact with the resistor 15 before the rubber member 20 is distorted. This can remove or reduce a dead zone in the input-output characteristic of the known analog input device.

In the above-described configuration, the first round surfaces 23j are provided between the bottom portion 23h and the outer side face 23i, and the second round surfaces 23f provided inside the pressing portion 23 are closer to the axis O-O than the first round surfaces 23j. For this reason, when the stroke of the key top 13 is gradually increased by increasing the load F, the rubber member 20 can be gradually deformed so that the protruding portion 23a conforms to the shape of the outer side face 23i through the first round surfaces 23j. Consequently, after the lowermost point (the point P shown in FIG. 1B) of the movable electrode 18 touches the resistor 15, the deformed outer side face 23i gradually presses the outer region of the movable electrode 18 in accordance with the load F or the stroke. Therefore, the output voltage characteristic with respect to the load or stroke can be made substantially linear.

By forming the outer side face 23i of a curved surface connected to the first round surfaces 23j and having a large radius of curvature, the linearity can be enhanced.

Figure 3:
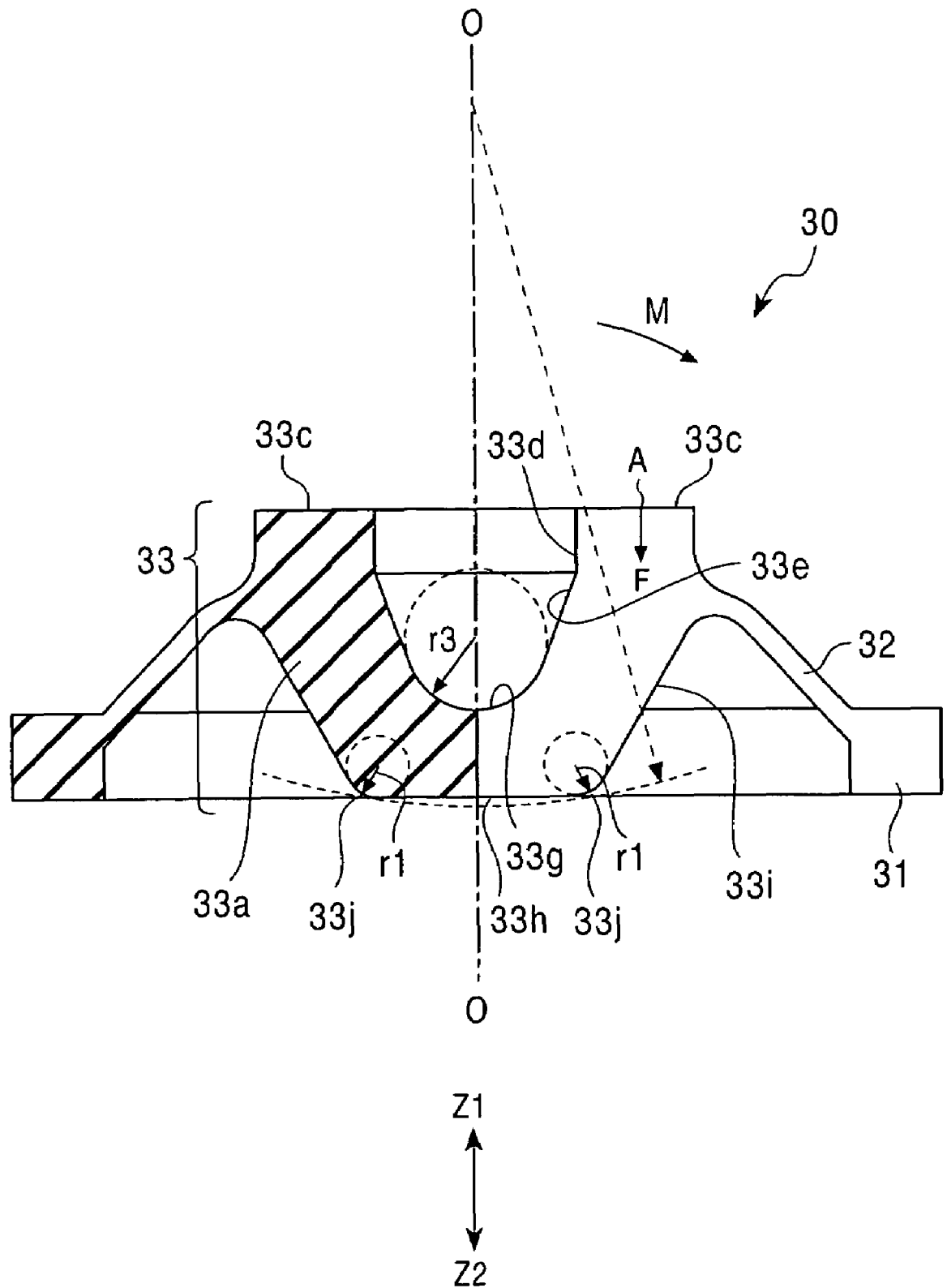
FIG. 3 is a cross-sectional view of a rubber member in a second embodiment of the present invention.

FIG. 3 is a cross-sectional view of a rubber member according to a second embodiment of the present invention.

In the second embodiment, a rubber member 30 shown in FIG. 3 has a structure similar to that of the rubber member 20 shown in FIG. 2, but is different in the following respects.

That is, as shown in FIG. 3, a bottom face of an inner wall 33e that defines a cavity in a pressing portion 33 is formed only by a second round surface 33g having a predetermined radius (second radius) r3.

A bottom portion 33h of an outer surface of the pressing portion 33 is formed, for example, by a flat surface or a curved surface made of a part of a spherical surface having a predetermined radius of curvature.

First round surfaces 33j having a predetermined radius (first radius) r1 are disposed symmetrically with respect to the axis O-O between the bottom portion 33h and an outer side face 33i. The bottom portion 33h is disposed close to or in contact with the surface of the above-described sheet member 17.

In the second embodiment, when the rubber member 30 is pressed in the Z2-direction through the key top 13, it is elastically deformed, and the movable electrode 18 is pressed through the sheet member 17. Therefore, the movable electrode 18 is bent in a convex form in the Z2-direction and touches the surface of the resistor 15 (see FIG. 1B).

Since the center of the bottom portion 33h of the rubber member 30 is also formed of a flat surface of a curved surface having a large radius of curvature, the moment M produced at the point A can be made smaller than in the conventional art. Therefore, it is possible to remove or reduce a dead zone that easily appears in the initial part of the input-output characteristic.

The first round surfaces 33j are provided by the side of the bottom portion 33h, and the second round surface 33g inside the cavity of the pressing portion 33 is disposed offset from the first round surfaces 33j toward the axis O-O. Therefore, when the stroke of the key top 13 is gradually increased by increasing the load F, a protruding portion 33a is gradually deformed to tilt sideward along the shape of the outer side face 33i through the first round surface 33j, in a manner similar to that in the above. Therefore, it is similarly possible to enhance the linearity of the input-output characteristic between the load or stroke and the output voltage.

A description will now be given of results of measurements of the relationship between the input (load or stroke) and the output (output voltage) in the above-described analog input device 10.

Figure 4:
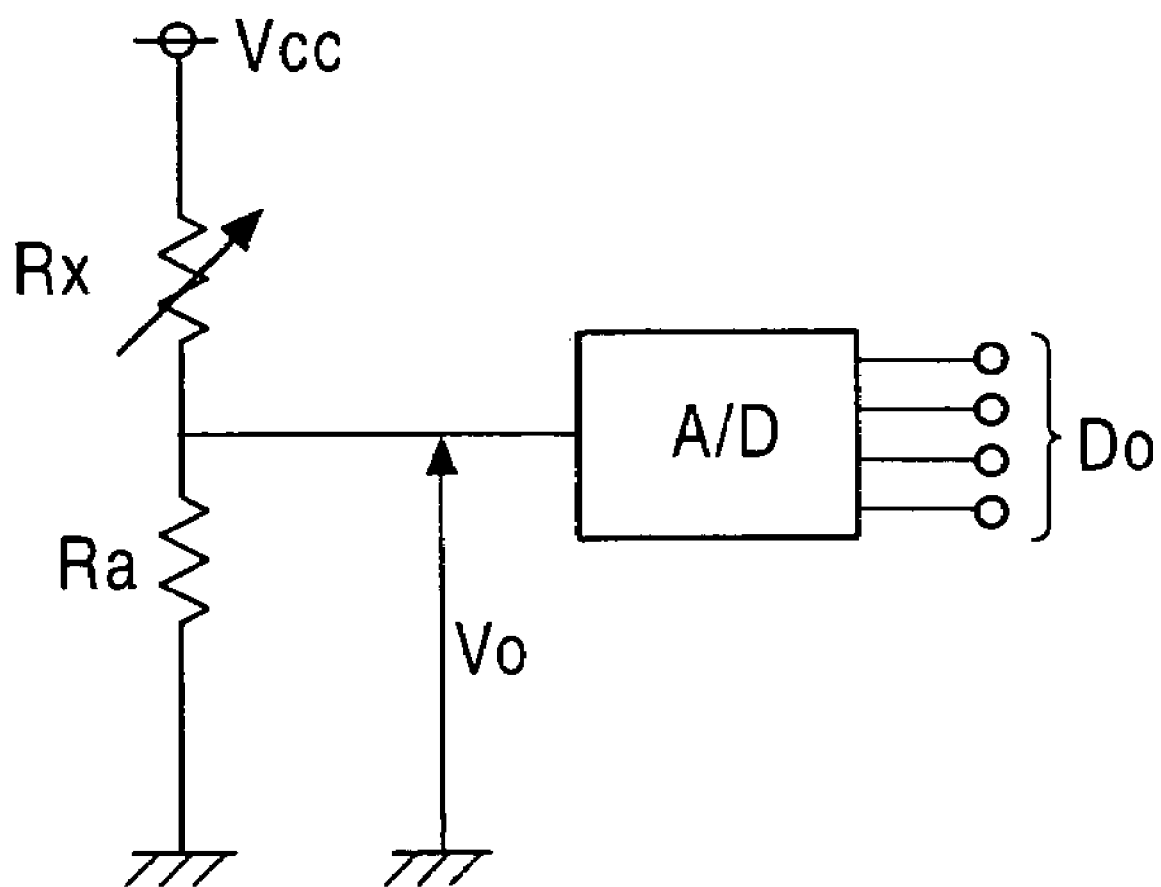
FIG. 4 is a circuit diagram of a measurement circuit for the analog input device.
Figure 5A:
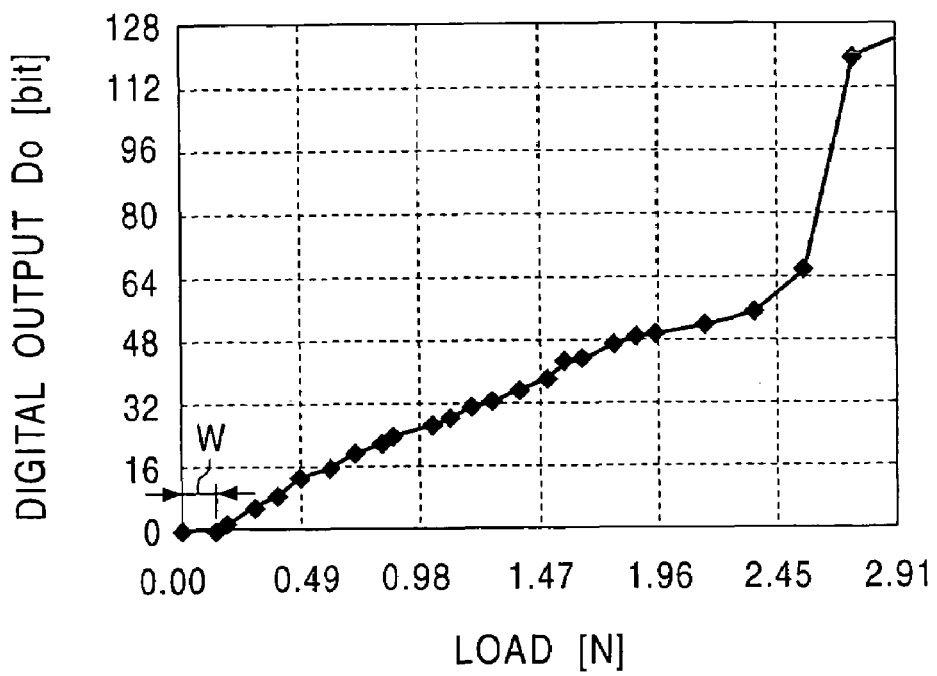
FIGS. 5A and 5B are graphs showing a load-digital output characteristic and a stroke-digital output characteristic, respectively, of the analog input device of the first embodiment.
Figure 5B:
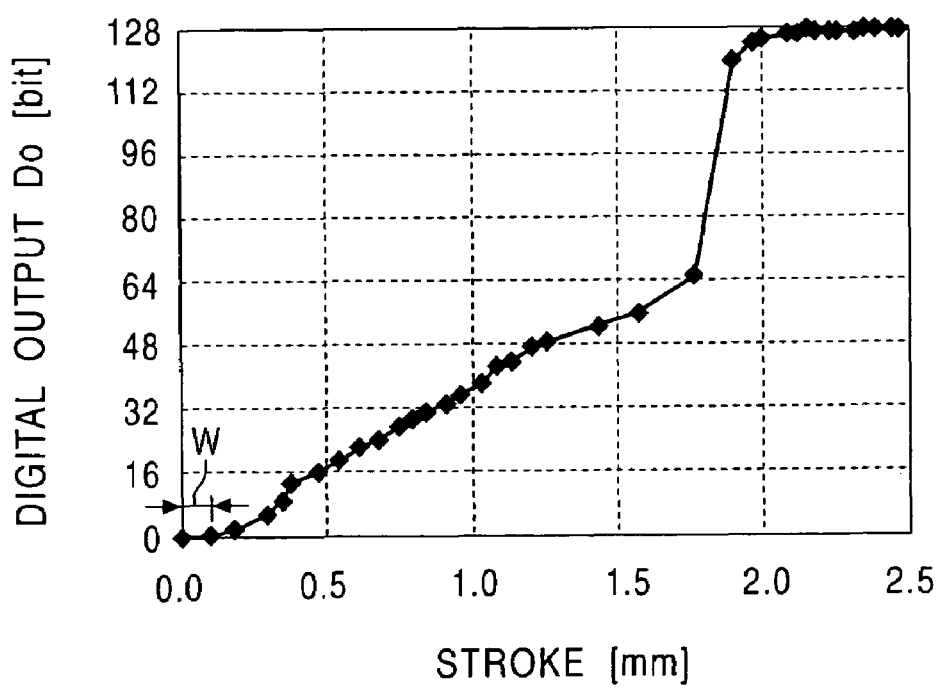
Figure 6A:
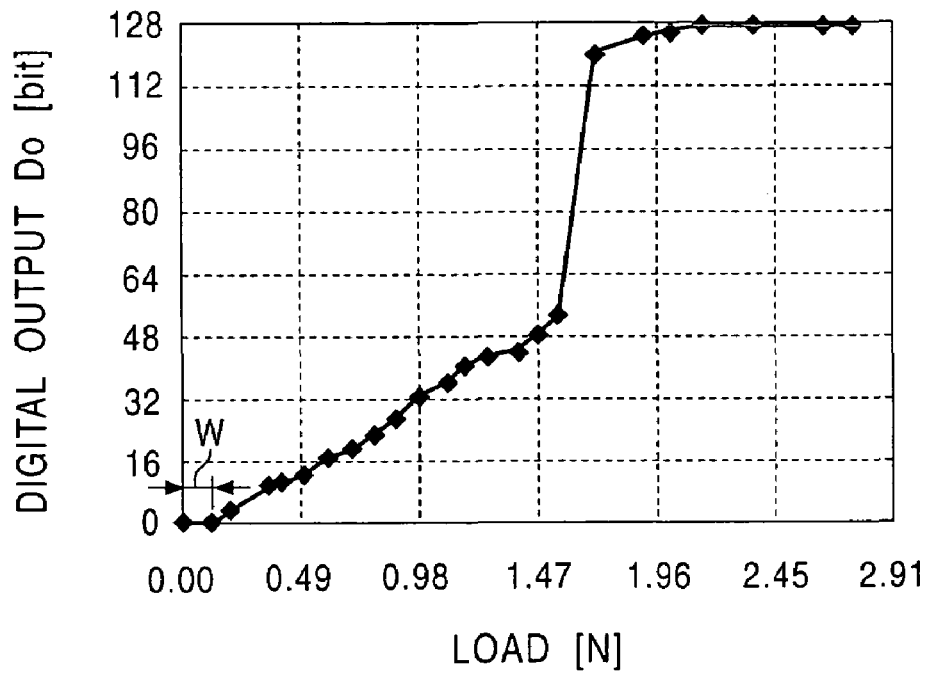
FIGS. 6A and 6B are graphs showing a load-digital output characteristic and a stroke-digital output characteristic, respectively, of the analog input device of the second embodiment.
Figure 6B:
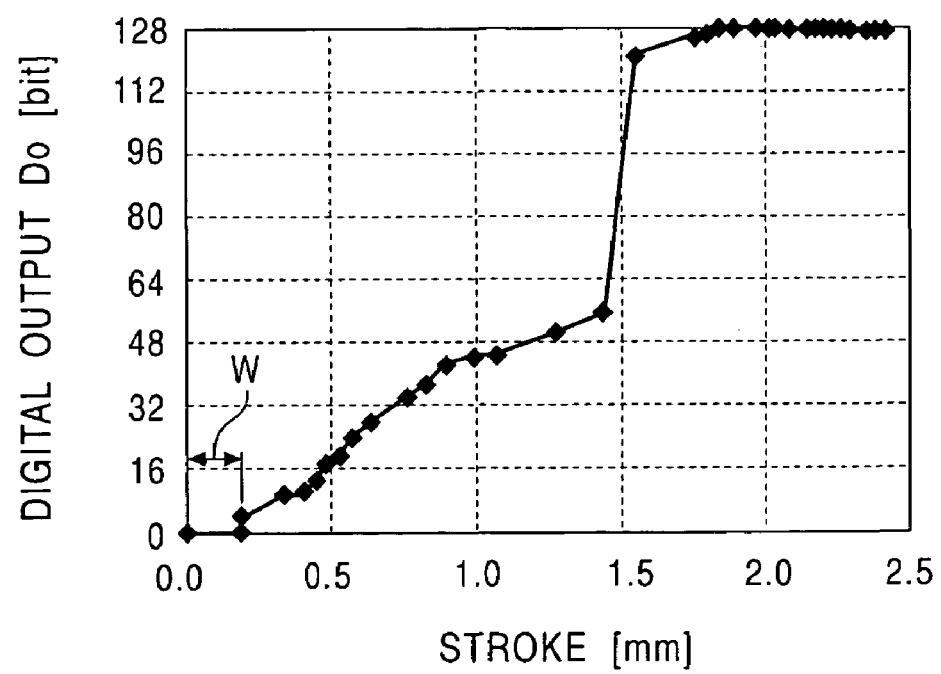
Figure 7:
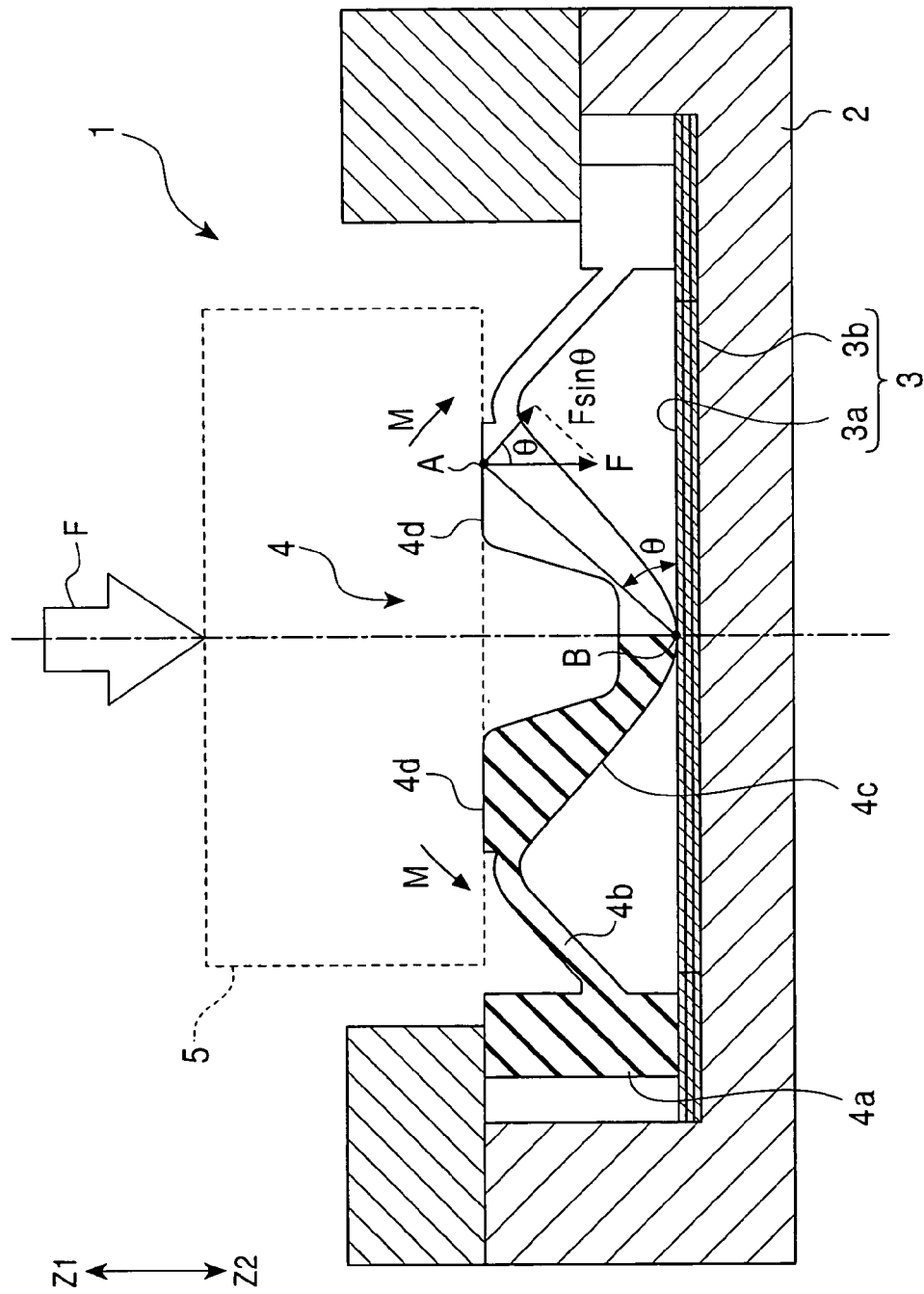
FIG. 7 is a cross-sectional view showing a state of a known analog input device before deformation.
Figure 8A:
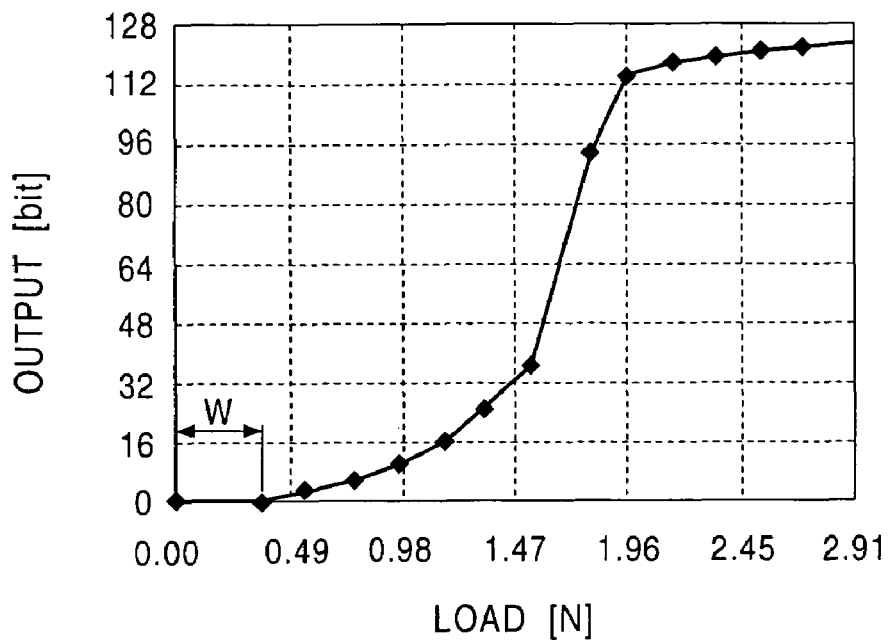
FIGS. 8A and 8B are graphs showing input-output characteristics of the known analog input device.
Figure 8B:
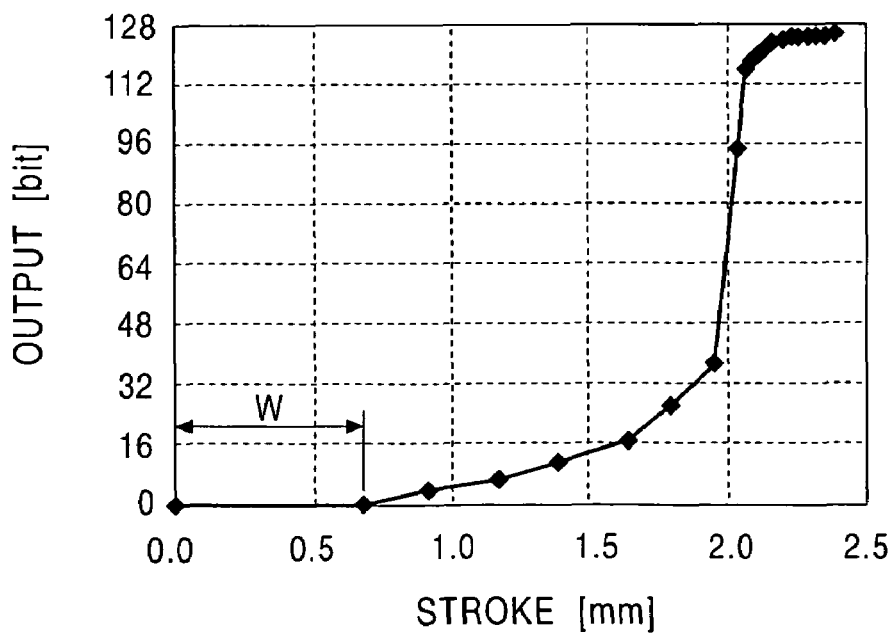

FIG. 4 is a circuit diagram of a measurement circuit for the analog input device 10, FIGS. 5A and 5B are graphs showing a load-digital output characteristic and a stroke-digital output characteristic, respectively, of the analog input device 10 using the rubber member 20 in the first embodiment shown in FIG. 2, and FIGS. 6A and 6B are graphs showing a load-digital output characteristic and a stroke-digital output characteristic, respectively, of the analog input device 10 using the rubber member 30 in the second embodiment shown in FIG. 3.

In FIG. 4, Rx represents the resistance of the resistor 15 in the analog input device 10, Ra represents a predetermined fixed resistance, Vcc represents the applied voltage, Vo represents the output voltage, and Do represents the digital output obtained by subjecting the output voltage Vo to A/D conversion.

In the measurement circuit shown in FIG. 4, the output voltage Vo is given by the following Equation:

$$Vo = \{Ra/(Rx+Ra)\} \times Vcc$$

When the load F applied to the key top 13 is 0 N (Newton), the stroke of the key top 13 is 0 mm. Therefore, the movable electrode 18 and the resistor 15 are placed in a non-contact state (open state). The resistance Rx, the output voltage Vo, and the digital output Do after A/D conversion in this case are set at $Rx_{(o)}$ Ω, $VO_{(o)}$ V, and 0 bit, respectively (see FIGS. 5A, 5B, 6A and 6B).

In a state in which a load F is applied to the key top 13, and a part of the bent movable electrode 18 is in point contact with the surface of the resistor 15 (see FIG. 1B), the resistance Rx is approximately equal to $Rx_{(o)}$ Ω. For this reason, the output voltage Vo is approximately equal to $Vo_{(o)}$ V, and the digital output Do is a small value (see FIGS. 5A, 5B, 6A and 6B).

When the stroke is increased by gradually increasing the load F, the contact area between the movable electrode 18 and the resistor 15 is gradually increased. Therefore, the resistance Rx decreases in inverse proportion thereto. Since the output voltage Vo increases as the load F and the stroke increase, according to the above Expression 1, the input-output characteristic is substantially linear and provides high linearity within a predetermined range of loads or strokes, as shown in FIGS. 5A, 5B, 6A and 6B.

In these figures, the output voltage Vo is approximately equal to $Vo_{(0)}$ V while the load F or stroke needed in order for the movable electrode 18 to touch the resistor 15 is applied from an unloaded state. Therefore, a small dead zone W in which the digital output Do is 0 bit appears. However, this dead zone can be made smaller than in the conventional art. By minimizing the small gap G, the analog input device 10 provides a characteristic in which the load F and the stroke linearly increase from near 0.

While the change in resistance between the movable electrode 18 and the resistor 15 that constitute the analog-quantity generating unit is detected in the above-described embodiment, the present invention is not limited thereto. For example, it may be possible to detect the electrostatic capacitance that varies depending on the change of the distance between a movable electrode and a fixed electrode opposing each other due to a key-pressing operation.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An analog input device comprising:
    a key top to be pressed;
    an analog-quantity generating unit for outputting an analog signal in accordance with an amount of pressing of the key top; and
    a rubber member for pressing the analog-quantity generating unit by elastic deformation in accordance with the amount of pressing of the key top,
    wherein a bottom portion of the rubber member is close to or in contact with the analog-quantity generating unit in a predetermined area,
    wherein the rubber member includes a base portion provided on an outer periphery, a support portion extending from the base portion toward a center of the rubber member, and a pressing portion provided at the center,
    wherein, in a cross section of the rubber member taken along a plane including a center axis of the pressing portion, an outer surface of the pressing portion includes first round surfaces connected to the bottom portion and having a first radius, and outer side portions provided between the first round surfaces and the support portion and
    wherein the bottom portion of the rubber member is formed of a flat surface or a curved surface having a large radius of curvature, and the flat surface or the curved surface is brought into surface-contact with the analog-quantity generating unit when the key top is pressed,
    wherein the pressing portion has a cavity, and a second round surface having a second radius is provided on a bottom face of the cavity, the second round surface including first and second parts that are disposed symmetrically with respect to the axis, and a flat or curved face is provided between the first and second parts, and
    wherein the first and second parts are offset from the first round surfaces toward the axis in the radial direction orthogonal to the axis.

2. The analog input device according to claim 1, wherein the analog-quantity generating unit includes a movable electrode and a resistor that oppose with a predetermined gap therebetween, and the bottom portion is disposed close to or in contact with the movable electrode or the resistor.

3. The analog input device according to claim 1, wherein the flat surface or the curved surface is brought into surface-contact with the analog-quantity generating unit before the rubber member is deformed by pressing of the key top.

4. An analog input device
    a key top to be pressed;
    an analog-quantity generating unit for outputting an analog signal in accordance with an amount of pressing of the key top; and
    a rubber member for pressing the analog-quantity generating unit by elastic deformation in accordance with the amount of pressing of the key top,
    wherein a bottom portion of the rubber member is close to or in contact with the analog-quantity generating unit in a predetermined area, and the bottom portion of the rubber member is formed of a flat surface or a curved surface having a large radius of curvature, and the flat surface or the curved surface is arranged to be in surface-contact with the analog-quantity generating unit before the rubber member is deformed by pressing of the key tops,
    wherein the pressing portion has a cavity, and a second round surface having a second radius is provided on a bottom face of the cavity, the second round surface including first and second parts that are disposed symmetrically with respect to the axis, and a flat or curved face is provided between the first and second parts, and
    wherein the first and second parts are offset from the first round surfaces toward the axis in the radial direction orthogonal to the axis.

* * * * *